Oct. 8, 1963 K. EBNER 3,106,306
BOTTLE OF PLASTIC MATERIAL AND CLOSURE MEMBER THEREFOR
Filed July 14, 1960 2 Sheets-Sheet 1
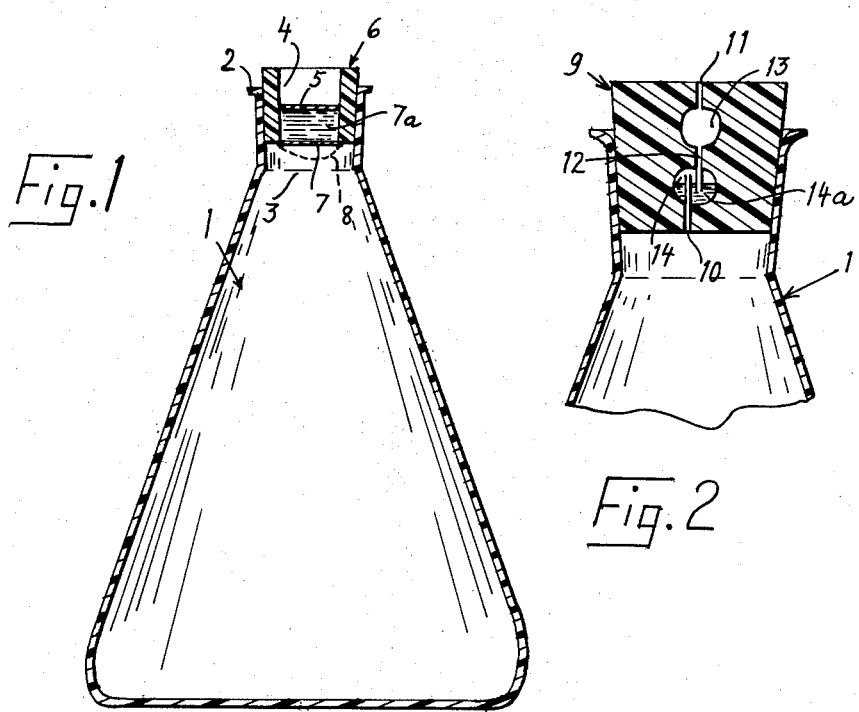
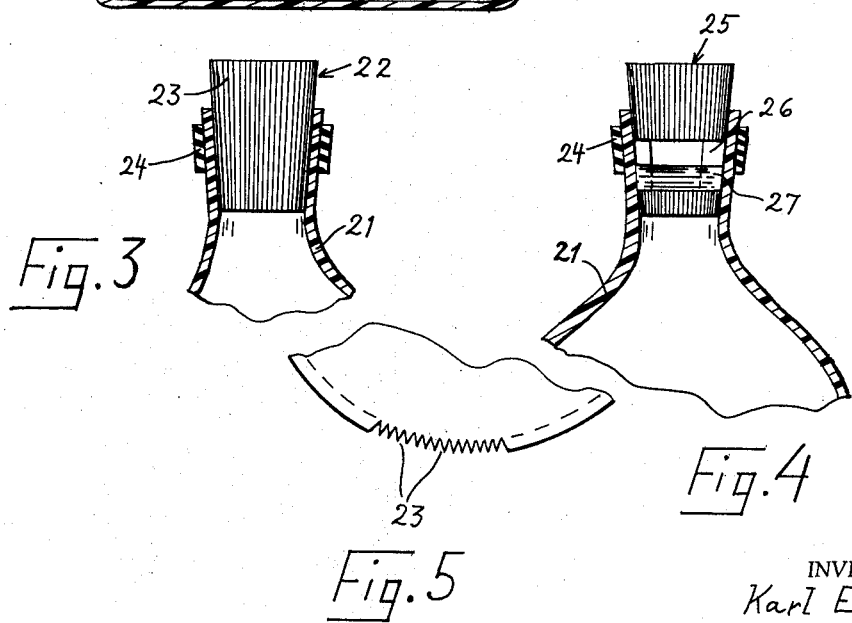
INVENTOR:
Karl Ebner Oct. 8, 1963 K. EBNER 3,106,306
BOTTLE OF PLASTIC MATERIAL AND CLOSURE MEMBER THEREFOR
Filed July 14, 1960 2 Sheets-Sheet 2

INVENTOR:
Karl Ebner

# United States Patent Office 3,106,306
Patented Oct. 8, 1963

3,106,306
BOTTLE OF PLASTIC MATERIAL AND CLOSURE MEMBER THEREFOR
Karl Ebner, Neufeldstr. 3, Oberursel, Taunus, Germany
Filed July 14, 1960, Ser. No. 42,896
4 Claims. (Cl. 215—56)

The present invention relates to containers, particularly bottles of plastic materials.

It is known to make bottles or other containers for liquids, of synthetics, especially of plastics, to be used instead of glass containers or bottles. Such bottles of plastics have the advantage of being shock- and impact-resistant.

It is a further advantage that such plastic bottles can be hermetically sealed after filling, by screwing, welding or cementing thereto a sealing or closure member of the same material. Furthermore, almost any liquid can be introduced into such bottles, since the synthetic or plastic material is fairly resistant to basic and acid liquids.

In many cases, however, a vapor or gas may develop or be evolved from the liquid introduced into the bottle and cause a subsequent increase of pressure in the sealed bottle; or the liquid contents may expand so that these bottles or containers must be provided with comparatively thick walls. Thus, a considerable increase in production costs will be caused in some cases, so that in many instances plastic containers cannot compete with glass bottles on the market, particularly if the bottles or containers are intended to be used once only and then discarded.

If, on the other hand, bottles or containers made of synthetic, particularly of plastic material are made with thin walls, so as to cut down the costs, there is a risk that with a subsequent increase in pressure, due to gas development, for instance by the formation of carbon dioxide by continued fermentation after sealing, or to the heating of the liquid contents, these bottles may burst.

Although certain synthetic materials will yield before bursting, an undesirable swelling or distortion will occur with the result that the outer packing of the bottles will be destroyed or damaged, particularly when several plastic bottles or containers are stored close together or when some containers crack up which are stacked in a rigid outer packing.

It is an object of the present invention to overcome the disadvantages of existing plastic containers mentioned above.

It is another object of the invention to provide plastic containers, particularly bottles, which will retain their shape even though the contents of the container tend to gas development during storage.

It is yet another object of the invention to make thin-walled plastic bottles which are inexpensive and can be discarded after the contents have been used up.

It is a further object of the invention to make a closure member for the above-mentioned thin-walled containers or bottles which cooperate with said containers in making developing gas pressure harmless.

Other objects and advantages of the invention will become apparent from the following detailed description and the accompanying drawings.

For the purpose outlined above, it is necessary to make the containers or bottles of thin-walled material in such a manner that increase of pressure in the interior of the sealed container is not harmful.

According to the invention, the bottle is provided with an outlet orifice that is sealed by a material which is permeable to gas, but impermeable to liquids, such for example as a gas-permeable but liquid-impermeable membrane.

According to one embodiment of the invention, the orifice itself may be permeable for gas but impermeable for liquid, e.g. by making it in the form of a capillary, or, if required, a multiplicity of capillaries.

According to another particularly satisfactory embodiment of the invention, this outlet-orifice is suitably combined with the closure member, seal or stopper.

In some cases, one or two membranes that are gas-permeable but liquid-impermeable are mounted in an outlet passage through the stopper and a capillary can likewise be mounted in the closure, through which gases, but not liquids, can escape from the interior of the bottle or container to the outside; furthermore, capillaries of a kind that will not allow air from the outside to flow into the interior of the bottle, can be used.

A further embodiment of the invention relates to a development for simplifying the closure. If, for instance, a bottle is made of a thin-walled plastic material and this bottle is filled with a liquid which consistently develops a small quantity of vapor or gas, so that there is practically always a certain, though slight, excess pressure inside the bottle, it is quite sufficient to make the closure or seal so that it is knurled on its circumference with shallow grooves having spaces of a size somewhat similar to the size of a capillary. It is then quite possible that vapors or gases developing inside the bottle will escape through this capillary-like knurled closure through which the liquid itself cannot pass.

This embodiment makes it possible to produce a closure member from a material that is different from the material of which the bottle is made. In order to prevent the material of the plastic bottle, into which the closure member is introduced, from yielding or deforming, an india rubber ring or the like can surround the opening of the bottle or container.

It has also been found that a compensating closure can be produced at very low expense with a stopper of any sort of material, if such a stopper is centrally drilled or punched out to form a passage. Such a passage of a few millimeters, e.g. 3 to 5 mm., in diameter in the center of the closure member, is, according to the invention sealed off with a porous mass.

It is advisable to have the size of the pores in the mass of such dimension as to allow the passage of gases but not that of liquids. It suffices, if, for instance, a small piece of foam rubber is pressed into this passage and it has been found that foam rubber with suitable pores can be produced so that gases developing from the interior of the bottle or container can escape but that no liquid can leak out.

Accordingly, it is sufficient if the foam rubber mass is only slightly pressed into the passage through the closure and in such cases where it is desired to avoid air from the outside coming into contact with the contents of the bottle or container, two foam rubber pieces are pressed into the passage at the closure with a sealing fluid that is located between such two foam rubber parts.

The vapor or gas escaping from the interior of the bottle under small excess pressure flows through the inner piece of foam rubber, then through the sealing fluid and finally through the outer piece of foam rubber, to the atmosphere.

No external air, however, can penetrate into the bottle, as this air after passage through the outer piece of foam rubber comes into contact with the sealing fluid which bars the passage through the inner piece of foam rubber.

In the following, the invention will be more fully described with reference to the accompanying drawings, but it should be understood that these are given by way of illustration and not of limitation and that many changes in the details can be made without departing from the spirit of the invention.

FIGURE 1 shows one embodiment of a bottle with a closure according to the invention;

FIGURE 2 shows another embodiment;

FIGURE 3 illustrates a bottle neck with a stopper having a knurled or grooved surface;

FIGURE 4 shows a similar embodiment with knurled stopper;

FIGURE 5 shows part of the circumference of a closure member having a knurled surface;

Figure 6:
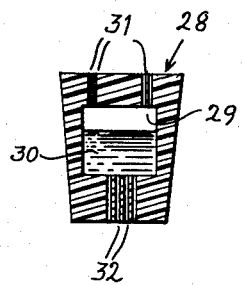
FIGURES 6 and 7 show another structural form of a stopper with cavities, in upright and overturned lying flat positions, respectively.

In FIGURE 1 of the drawings, 1 is a bottle of plastic material containing a liquid 3, the neck 2 of the bottle being closed by a stopper 6. If necessary, this stopper 6, which preferably is made of the same material as the bottle 1, is cemented or otherwise secured to the neck 2 of the bottle 1 so that complete sealing is achieved.

The stopper 6 is made with a passage 4 and is provided with a membrane 5 which is gas-permeable, so that any vapor or gas that evolves can escape.

At the lower part of the stopper 6, a sieve-like part or strainer 8 can be provided, in order to prevent impurities from reaching the membrane 5.

This form of structure, however, has the disadvantage of allowing the outer air to penetrate into the interior of the bottle, so that there is a risk of the contents deteriorating in quality or flavor.

This disadvantage, due to the admission of air, can be eliminated in a simple manner by the arrangement of a second membrane 7, which is also gas-permeable, at a slight distance from the membrane 5, the gap between these two membranes 7 and 5 being filled with a sealing fluid 7a which prevents air from penetrating into the interior of the bottle.

In the embodiment of the stopper, according to FIGURE 2, the drawback due to the admission of air is eliminated in a different manner. Here a stopper 9 of the bottle 1 is provided with a capillary system 10, 11 consisting of a plain glass capillary tube which is sealed into the stopper 9 as will be explained hereafter in detail.

As is known, no liquid flows through such a capillary, not even if the bottle lies flat, but evolved gases can pass through the capillary easily, so that the pressure inside the bottle 1 does not increase.

To prevent the air from outside from reaching the contents of the bottle, the capillary system, as shown in the drawing, is divided and the parts are arranged in a particular way.

In this arrangement, two capillary tubes 10 and 11 terminating in cavities 14 and 13, respectively, are provided in the stopper 9, the cavities 13 and 14 being connected by means of a tube 12 that has an internal diameter that is a little larger than the internal diameter of the capillaries; the cavity 14 contains a suitable sealing fluid 14a.

If the pressure inside the bottle increases, the gases force the sealing fluid in the connecting tube 12 upwards and flow through the capillary 11 into the open. If no gas develops, the sealing fluid in the cavity 14 prevents the outside air from entering the bottle and contaminating the liquid therein.

The capillary 10 leading into the cavity 14, as well as the connecting tube 12 must extend into the cavity 14 to prevent the admission of air, so that the connecting tube 12 dips into the sealing fluid, while the end of the capillary 10 is located above the level of this liquid.

In FIGURE 3, 21 is the neck of a bottle or container into which a stopper 22 has been introduced. The stopper 22 has a finely milled or knurled external surface 23, and 24 is an india-rubber band or ring which is placed on the upper part of the neck of the bottle, in order to press the bottle neck elastically against the stopper.

According to FIGURE 4, a stopper 25 is provided with an annular groove or gutter 26 to contain a sealing fluid 27. This stopper 25 can be wholly or partly milled or knurled on its external surface and 24 is against the compressing ring, as described earlier. FIGURE 5 illustrates the knurled surface 23 of either stopper 22 or 25 shown in FIGURES 3 and 4, respectively.

Figure 7:
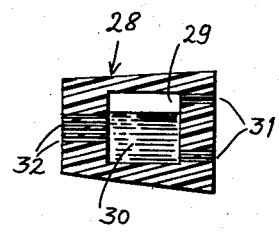

In the structure shown in FIGURE 6, the stopper 28 has an inner cavity 29 for a sealing fluid 30. This stopper 29 is composed of two parts, so that the cavity 29 is formed between them. Capillaries 31 and 32 are provided above and below the cavity 29, the capillaries 31 connecting with the outer air, while the capillaries 32 connect with the interior of the container. The sealing fluid 30 is introduced into the cavity 29 in such a quantity that the lower capillaries 32 will remain under the sealing fluid 30 when the bottle is not standing erect, but lies horizontally, as shown in FIGURE 7, this allowing gas to escape but preventing any admission of air from outside into the bottle.

Figure 8:
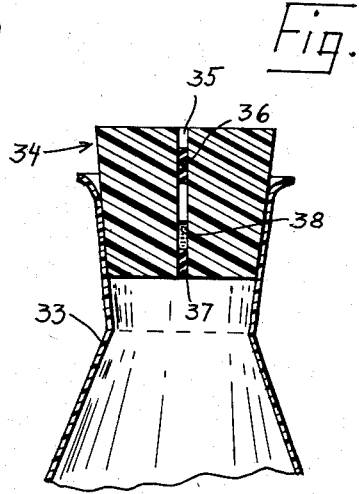
FIGURE 8 shows a structure of a closure member with porous material arranged in a passage.

As shown in FIGURE 8, the neck 33 of a bottle has a stopper 34 therein. The stopper 34 has a vertical bore 35 which connects the interior of the bottle with the outer air.

In the outer end of the bore 35, a plug 36 of foam rubber or the like is inserted, and at a distance therefrom another plug 37 of foam rubber or the like is also inserted, the intervening space between the plugs 36 and 37 containing a sealing fluid 38.

The sealing fluid may consist of water or a liquid like oil, or the like; the choice of the foam rubber or other porous substance depends on whether or not it is liquid-impermeable, while in the selection of the sealing fluid the contents of the bottle have to be taken into consideration.

What I claim is:

1. A closure member for liquid containers of plastic material of low resistance to pressure having a thin-walled body portion and a neck portion, said closure member being designed for liquid-tight engagement with the neck portion of said container and consisting of a structure which is a stopper-like body having two cavities, one cavity having a capillary outlet to the air, the other cavity having a capillary connection to the interior, a sealing liquid for partly filling said second cavity, said capillary in said second cavity having one end above said sealing liquid, and a tube for connecting said two cavities, said connecting tube extending into said second cavity toward a wall thereof, and toward the level of the sealing liquid, whereby upon pressure rising within the interior of the bottle gas will be expelled through said liquid and upon drop of pressure the sealing liquid in the second cavity will recede from the connecting tube and prevent air from outside from entering the interior of the botle.

2. A closure member for liquid containers of plastic material of low resistance to pressure having a thin-walled body portion and a neck portion, said closure member being designed for liquid-tight engagement with the neck portion of said container and consisting of a structure which is a stopper having a cavity in said stopper partly filled with a sealing liquid, and a first plurality of capillaries leading from the cavity to the outside, and a second plurality of capillaries leading from the cavity to the interior of the bottle.

3. A closure member for liquid containers of plastic material of low resistance to pressure having a thin-walled body portion and a neck portion, said closure member being designed for liquid-tight engagement with the neck portion of said container and consisting of a structure, which is in the form of a stopper having an externally knurled surface over at least a part thereof, so as to form capillary passages with the wall of the neck portion of the container and wherein a resilient band under compression is arranged around the neck at the outside to press the same against the stopper.

4. A closure member for liquid containers of plastic material of low resistance to pressure having a thin-walled body portion and a neck portion, said closure member being designed for liquid-tight engagement with the neck portion of said container and consisting of a structure which is in the form of a stopper having a narrow vertical outlet passage therein, and at least one sponge member being arranged in said passage, the pores of said sponge member forming capillaries that are gas-permeable and liquid-impermeable.

References Cited in the file of this patent

UNITED STATES PATENTS

| | | |
|---|---|---|
| 1,700,227 | Jeffery | Jan. 29, 1929 |
| 2,394,333 | Schneider | Feb. 5, 1946 |
| 2,770,234 | Nesset et al. | Nov. 13, 1956 |